(12) United States Patent
Oh

(10) Patent No.: US 11,248,721 B2
(45) Date of Patent: Feb. 15, 2022

(54) SUPPORT DEVICE FOR USE WITH ELECTRICAL BOX

(71) Applicant: ERICO INTERNATIONAL CORPORATION, Solon, OH (US)

(72) Inventor: Michael Hung-Sun Oh, Twinsburg, OH (US)

(73) Assignee: ERICO International Corporation, Solon, OH (US)

(*) Notice: Subject to any disclaimer, the term of this patent is extended or adjusted under 35 U.S.C. 154(b) by 12 days.

(21) Appl. No.: 16/773,176

(22) Filed: Jan. 27, 2020

(65) Prior Publication Data

US 2020/0240549 A1 Jul. 30, 2020

Related U.S. Application Data

(60) Provisional application No. 62/797,093, filed on Jan. 25, 2019.

(51) Int. Cl.
| | | |
|---|---|---|
| *F16L 3/08* | (2006.01) | |
| *H02G 3/00* | (2006.01) | |
| *H02G 3/12* | (2006.01) | |
| *H02G 3/08* | (2006.01) | |

(52) U.S. Cl.
CPC .............. *F16L 3/08* (2013.01); *H02G 3/081* (2013.01); *H02G 3/123* (2013.01); *H02G 3/263* (2013.01)

(58) Field of Classification Search
CPC ....... F16L 3/08; F16L 3/26; F16L 3/22; F16L 3/223; H02G 3/081; H02G 3/123; H02G 3/263; H02G 3/12; H02G 3/126
See application file for complete search history.

(56) References Cited

U.S. PATENT DOCUMENTS

| | | |
|---|---|---|
| 1,211,182 A | 1/1917 | Kruse |
| 2,023,083 A | 12/1935 | Knell |
| 2,881,924 A | 4/1959 | Kruse et al. |
| 5,141,185 A | 8/1992 | Rumbold et al. |
| 5,927,667 A | 7/1999 | Swanson |
| 6,209,836 B1 | 4/2001 | Swanson |
| 6,666,419 B1 | 12/2003 | Vrame |
| 7,271,335 B2 | 9/2007 | Dinh |
| 7,271,336 B2 | 9/2007 | Dinh |
| 7,521,631 B2 | 4/2009 | Dinh |
| 7,956,285 B2 | 6/2011 | Tally et al. |
| 8,387,927 B1* | 3/2013 | Medlin, Jr. ............ H02G 3/126 248/68.1 |
| 8,496,211 B2 | 7/2013 | Rinderer |
| 9,653,899 B2 | 5/2017 | Salian et al. |
| 10,077,866 B2 | 9/2018 | Witherbee |
| 2016/0241008 A1* | 8/2016 | Korcz .................... H02G 3/125 |
| 2019/0086025 A1 | 3/2019 | Witherbee |

OTHER PUBLICATIONS

Thomas & Betts Corporation Wire & Cable Management 2012 Catalog, 1060 pages (Year: 2012).*
Caddy "Colorado Jim" cable support CJ6 spec sheet: 2017 (Year: 2017).*

* cited by examiner

*Primary Examiner* — Eret C McNichols
*Assistant Examiner* — Ding Y Tan
(74) *Attorney, Agent, or Firm* — Quarles & Brady LLP

(57) ABSTRACT

A support device can have an opening to receive electrical cable or conduit and a gate that is configured to bend between an open configuration and a closed configuration relative to the opening. A locking tab can be provided configured to be selectively engaged with the gate to secure the gate in the closed configuration.

19 Claims, 8 Drawing Sheets

SUPPORT DEVICE FOR USE WITH ELECTRICAL BOX

RELATED APPLICATIONS

This application claims priority to U. S. Provisional Patent Application No. 62/797,093, titled "Support Device for Use with Electrical Box" and filed Jan. 25, 2019, the entirety of which is incorporated herein by reference.

BACKGROUND

In many applications it may be useful to fixedly support raceways, including conduit, such as electric metallic tube (EMT) conduit, or cable, such as metal clad (MC) cable, relative to an electrical box into which those raceways enter. In some contexts, support of the raceways within a specified distance of the electrical box is required by code, and may require bending the raceway to an adjacent framing member and securing the conduit to the framing member.

SUMMARY

Some embodiments of the invention provide a support device for electrical cable or conduit that can have one or more bendable support features arranged along one or more support paths for electrical cable or conduit. A gate can be provided configured to bend between an open configuration and a closed configuration, with the gate in the open configuration being clear of the one or more support paths, and the gate in the closed configuration being aligned to secure the electrical cable or conduit within the one or more support paths. A locking tab can be provided configured to be selectively engaged with the gate to secure the gate in the closed configuration.

Some embodiments of the invention provide a support assembly for electrical cable or conduit that can have a support device configured to be removably engaged with a support structure. The support device can include an integrally formed body with a support portion configured to be removably engaged with the support structure, a gate configured to bend between an open configuration and a closed configuration, at least one gate bendable support feature that extends from the gate and is configured to engage a first side of the electrical cable or conduit, and at least one support-portion bendable support feature that extends from the support portion and is configured to a second side of the electrical cable or conduit. The gate can be configured to hingedly move between an open configuration and a closed configuration. The gate in the open configuration can be disposed to admit the electrical cable or conduit into engagement with the at least one support-portion bendable support feature. The gate in the closed configuration can be aligned to dispose the at least one gate bendable support feature in engagement with the electrical cable or conduit opposite the at least one support-portion bendable support feature.

Some embodiments of the invention provide a method of supporting electrical cable or conduit relative to a support structure, using a support device with first and second bendable support features, a gate, and a locking tab. The method can comprise attaching the electrical cable or conduit to the support structure, attaching the support device to the support structure to a first side of the electrical cable or conduit, with the gate in an open configuration, to engage the first bendable support feature with the first side of the electrical cable or conduit. The method can further include hinging the gate to a closed configuration, to engage the second bendable support feature with a second side of the electrical cable or conduit that is opposite the first side and securing the gate in the closed configuration with the locking tab.

Some embodiments of the invention provide a support device for electrical cable or conduit, for use with a support structure. An integrally formed support body can include: a front portion that is configured to support the support body relative to the support structure and a support portion that extends at an angle from the front portion. The support portion can include: an opening to receive electrical cable or conduit, the opening extending laterally along the support portion; a hinge axis disposed at the back of and a first lateral end of the opening; and a gate that defines, when in a closed configuration, a back wall of the opening. The gate can be configured to rotate about the hinge axis between the closed configuration and an open configuration in which the gate is angled away from the support portion to allow electrical cable or conduit to be received within the opening.

Some embodiments of the invention provide a support device for electrical cable or conduit, for use with a support structure. A support body can be configured to be engaged with the support structure and can include an opening that is elongate in a first direction and extends along a first plane. A gate can be connected to the support body to define, in a closed configuration, a side of the opening that extends along the first direction. The gate can be configured to rotate away from the first plane, from the closed configuration to an open configuration, to open the side of the opening to receive electrical cable or conduit into the opening.

Some embodiments of the invention provide a method of securing electrical cable or conduit relative to a support structure. Electrical cable or conduit can be installed on an electrical box and the electrical box can be installed on the support structure. A support device can be provided that includes a support body with a gate and an opening that extends along a first plane, the gate defining, in a closed configuration, a first side of the opening. The gate can be rotated away from the first plane to move the gate from the closed configuration to the open configuration and thereby open the first side of the opening. After installing the electrical cable or conduit on the electrical box and installing the electrical box on the support structure, and with the gate of the support structure in the open configuration, the support device can be moved towards the support structure in a first direction, at least a component of which extends in parallel with the first plane, to attach the support device to the support structure and receive the electrical cable or conduit in the opening via the first side of the opening. The gate can be rotated to the closed configuration to secure the electrical cable or conduit within the opening.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
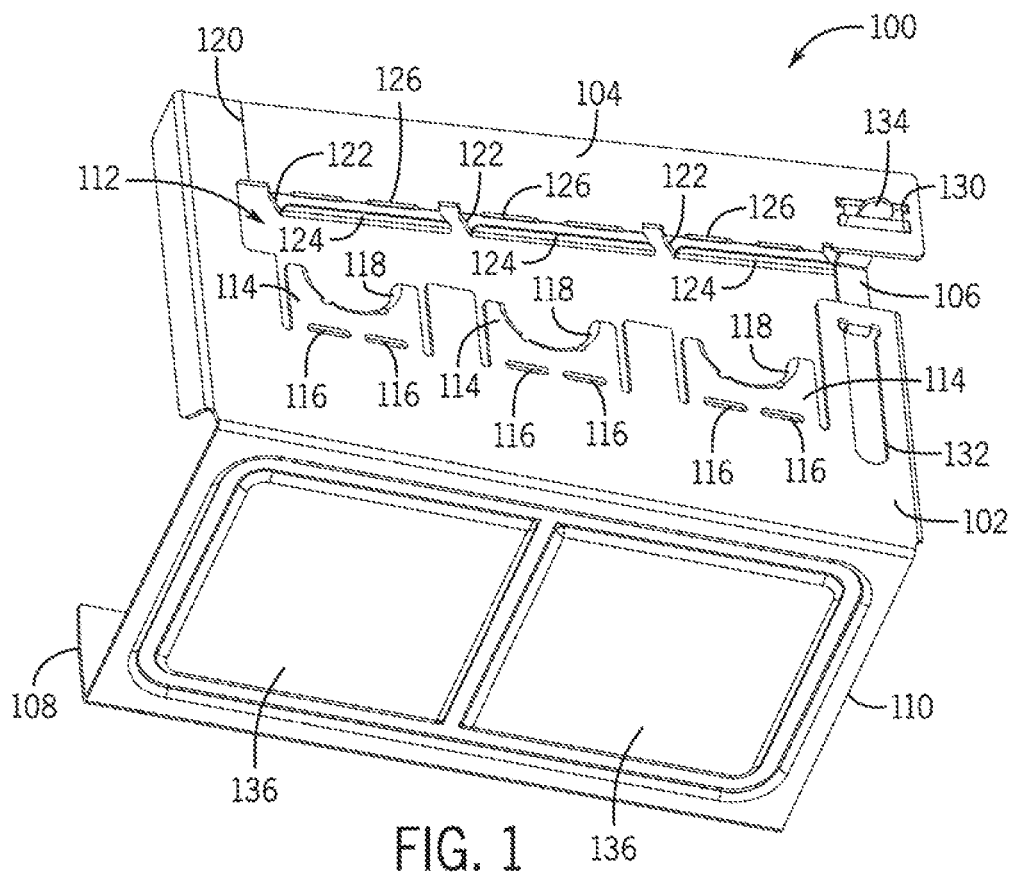
FIG. 1 is a top front isometric view of a support device according to an embodiment of the invention, with a gate in a partially closed configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a support device that can be used to support a conduit or a cable relative to an electrical box. The context and particulars of this discussion are presented as examples only. For example, embodiments of the disclosed invention can be configured in various ways, including with other shapes and arrangements of elements that are expressly described or illustrated. Similarly, embodiments of the invention can be used with arrangements of electrical boxes, supports for electrical boxes, or other assemblies other than those expressly illustrated or described herein.

In conventional arrangements, securing conduit or cable near an electrical box can be achieved through various methods, including bending the conduit with a pipe bender to be adjacent a framing member and securing the conduit to the framing member, bending the cable to a framing member and securing the cable to the framing member with a clamp, or installing a type of channel between the framing members and securing the conduit or cable to the channel with clamps. For example, a clamp, such as a one-hole strap, can be used to secure the conduit or cable to the framing member and a universal pipe clamp can be used to secure the conduit or cable to the channel. Although these conventional arrangements can provide an adequate support, labor can be fairly intensive for each arrangement, and space can be limited along the depth of a framing member, thereby limiting the number of conduits or cables that can be secured thereto. Further, in the case of conduit, more bends can create more restrictive pathways for pulling electrical conductors therethrough.

Embodiments of the invention can address these or other issues. For example, in some embodiments, a support device according to the invention can provide a relatively simple arrangement that can secure multiple conduits or cables (e.g., serving as a first means of support for an electrical box according to code requirements), without necessarily requiring the conduits or cables to be secured to a framing member or the use of separate clamps. As another example, some embodiments of the invention can secure multiple conduits or cables to an electrical box at the same time with only a single device. In some embodiments, support devices according to the invention can be readily installed by hand, including without the use of tools. In some embodiments, support devices according to the invention can be easily installed even after cable or conduit have been connected to a relevant electrical box or other support.

FIGS. 1-4 illustrate a support device 100 according to an embodiment of the present invention. The support device 100 includes a support portion 102, a gate 104, a locking tab 106, an engagement interface 108, and an extension portion 110. The support portion 102, the gate 104, the locking tab 106, the engagement interface 108, and the extension portion 110 are integrally formed as part of a single component that can be formed from pre-galvanized steel or other material.

In the illustrated embodiment, the extension portion 110 forms a front portion of the support device 100, with the support portion 102 and the engagement interface 108 extending at an angle from opposite ends thereof (e.g., at 90° from top and bottom ends, respectively). Accordingly, for example, the engagement interface 108 can be engaged with a top, front feature of a support structure (not shown in FIGS. 1-4) so that the support portion 102 extends rearward, above the support structure. In other embodiments, however, other configurations and installation orientations are possible.

The support portion 102 is substantially planar, including along the edges of a support opening 112 that extends therethrough. (As used herein, "substantially planar" indicates that a feature, the majority of which extends along a particular plane, with deviations only within standard manufacturing tolerances for the relevant manufacturing method, such as stamping.) As further detailed below, the support opening 112 is configured to define support paths for electrical cable or conduit so that the support device 100 can provide a first means of support for a particular installation. In the support device 100 the support opening 112 is an elongate opening that extends within the plane of the support portion 102, in the elongate direction, laterally along the support portion 102 and generally in parallel with a front edge of the support portion 102. In other embodiments, however, other configurations are possible.

In different embodiments, gussets, contours, or other features can be provided to increase the strength of a particular support device or feature thereof. For example, the lateral edges of the support portion 102 are bent approximately 90° from the planar main body of the support portion 102 to provide additional rigidity to the support portion 102.

Figure 2:
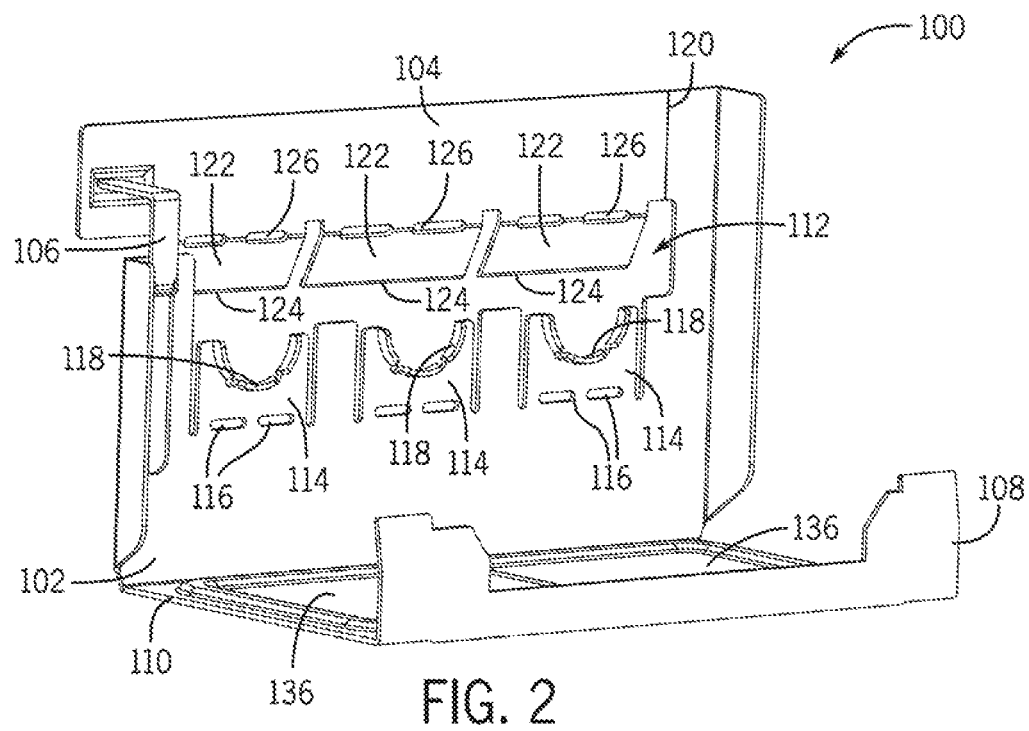
FIG. 2 is a bottom rear isometric view of the support device of FIG. 1.

In some embodiments, support features can be configured to extend into alignment with a support opening in order to engage cables or conduits within the opening. For example, the support portion 102 includes support features 114. In FIGS. 1 and 2, the support features 114 extend along the plane of the support portion 102 into the support opening 112. However, the support features 114 can be selectively bent out of the plane of the support portion 102, as appropriate, to support or provide clearance for particular cable or conduits, with an example of such bending shown in FIGS. 4 and 5. To facilitate easy bending, relief features can be provided, including the slotted relief features 116 as shown for the support device 100.

Generally, edges or other features of support features can be configured to contact cables or conduit in order to help support these structures relative to the relevant support device. In this regard, for example, the support features 114 include an arcuate support edge that faces concavely towards the support opening 112. Although the support edges of the support features 114 are illustrated as arcuate in shape, other shapes are also contemplated. Further, some embodiments can include additionally formed features. For example, the support edge extends along the base of a segmented, flange-like collar 118, that is bent at approximately 90° relative to the support features 112 to eliminate a sharp edge from making contact with supported conduit or cable. In the embodiment illustrated, each of the collars 118 includes a plurality of segments, although other configurations are possible.

In order to accommodate different sizes of cables and conduit, some support features can be bendable to different degrees relative to a relevant support portion. For example, the support features 112 of the support portion 102 are bendable over a range of at least approximately 90° relative to the plane of the support portion 102 to accommodate different sizes and types of electrical cable or conduit. As also noted above, for example, this can be seen in FIGS. 4 and 5, in which one of the support features 112 is bent relative to the plane of the support portion 102 to accommodate a particular cable or conduit configuration (not shown in FIG. 1). It is further contemplated that support features are bendable, in some embodiments, over a range of at least approximately 180° relative to the relevant support portion, including using bends that cause the support features to extend to either side of a plane of the support portion.

Generally, gates according to some embodiments of the invention can be opened and closed, including by simple hinging motion, in order to receive and secure, respectively, relevant cables or conduit within an associated opening. In this regard, for example, the gate 104 is configured to rotate at a hinge axis 120, relative to the support portion 102, between an open configuration (see FIG. 4) and a closed configuration (see FIG. 5). In the closed configuration, the gate 104 extends in parallel with and within the plane of the support portion 102, such that the gate 104 generally defines a planar continuation of the support portion 102 along the associated (e.g., back) side of the support opening 112. In other embodiments, however, other configurations are possible.

In some embodiments, manufactured features can be provided to define a hinge axis or otherwise facilitate rotating motion of a gate. For example, in the support device 100, the hinge axis 120 is defined by a score line that extends within the plane of the support portion 102, and perpendicularly to an elongate direction of the opening 112, at a closed, lateral end of the opening 112. In other embodiments, other features can be used, including slotted relief features such as shown for the support features 112. Further, other gates can be configured to move differently between open and closed configurations.

Thus, the gate 104 is configured to hinge away from the plane of the support portion 102 (e.g., upwardly) to open, without extending further forward or backward relative to the opening 112 and support paths extending therethrough along the path of travel of the gate 104 between open and closed configurations. Accordingly, for example, the gate can be hinged open and closed without interfering with cables of conduits that extend through the opening 112.

In different embodiments, different configurations of a gate are possible. For example, the gate 104 is substantially planar, and is configured to extend along and in parallel with the plane of the support portion 102 when the gate 104 is closed. Further, when in the closed configuration (see, e.g., FIG. 5) the gate 104 defines a side wall (e.g., a rear side wall) of the support opening 112. Accordingly, when the gate 104 is open (see, e.g., FIG. 4), a relatively large entrance is provided for the opening 112 and cables or conduits can be easily introduced into the opening 112. In contrast, when the gate is closed (see, e.g., FIG. 5), the gate 104 can prevent cables or conduits from being removed from the opening 112 in the direction of the gate 104.

In some embodiments, a gate can include support features that can engage cables or conduits, including cooperatively with other support features on an opposing side of the relevant support opening. For example, the gate 104 includes gate support features 122 that, when the gate 104 is in the closed configuration, are aligned with and opposite to the support features 112 of the support portion 102. Thus, when the gate 104 is in the closed configuration, a plurality of support paths are defined between the gate support features 122 and the support features 112 of the support portion 102. As such, for example, opposing sets of the gate support features 122 and the support-portion support features 112 can cooperate to engage and support relevant cables and conduit that pass through the support opening 112.

In different embodiments, different configurations can be used for gate support features. For example, the gate support features 122 have straight support edges 124 and are bendable along gate support reliefs 126. Each of the support edges 124 of the gate support features 122 also include a lip at which the support edges 124 are bent approximately 90°. As also discussed above, this can help to eliminate any sharp edges that might make contact with supported conduits or cables. In other embodiments, however, other configurations are possible. For example, some gate support features can be formed with arcuate support edges (e.g., similarly to the support features 114) and can be arranged opposite a support opening from support features with straight (or other) support edges.

Similarly to the support features 114, the gate support features 122 are bendable over a range of at least approximately 90° relative to the plane of the gate 104 to accommodate different sizes of the electrical cable or conduit. This can be seen in FIG. 4, for example, in which some of the gate support features 122 are bent (e.g., to about 62 degrees) from the plane of the gate 104 to accommodate relatively thin metal-clad cables and another of the gate support features 122 is bent to about 90° from the plane of the gate 104 to accommodate a relatively wide conduit (see also FIG. 6). It is further contemplated that the gate support features 122, in some embodiments, are bendable over a range of at least approximately 180° relative to the plane of the gate 104, including so as to be configurable to provide support above or below the plane of the gate 104.

As shown in FIGS. 1-5, the support portion 102 includes three support features 112 that at least partly define at least three support paths for the cable or conduit. Likewise, the gate 104 includes three corresponding gate support features 122 that, with the gate 104 in the closed configuration, further define the at least three support paths. In other embodiments, other configurations are possible, including configurations in which a support path is defined by only one support feature, or more than two support features, and configurations in which fewer or more than three support paths are provided.

In some embodiments, support devices according to the invention can be configured to be locked in a particular (e.g., closed) configuration. In this regard, for example, a flexible (e.g., manually bendable) locking tab can be provided on a gate or an associated support portion, to engage an opening on the other of the gate of the associated support portion, and thereby lock the gate in a closed configuration. In the illustrated embodiment, the locking tab 106 is located on and formed from the support portion 102, and is configured to extend perpendicularly across an open lateral end of the opening 112, opposite the hinge axis 120, to selectively engage with a locking aperture 130 in the gate 104 and thereby secure the gate 104 in the closed configuration. In the illustrated embodiment, the aperture 130 is configured as a closed-end locking slot, although other configurations are possible. In some embodiments, the locking tab 106 can be an elongate strap, as shown in the figures, including such a strap that is formed and extends from an end of a closed slot 132 (e.g., as integrally formed from a blank (see, e.g., FIG. 3) using a series of stamping operations.

In different embodiments, locking tabs can be bent in different ways to secure a gate. For example, to secure the gate 104 in a closed configuration, the locking tab 106 is bent approximately 180° relative to the plane of the support portion 102 and underneath the support portion 102, in order to extend in parallel with the plane of the support portion 102 and perpendicularly relative to the elongate direction of the opening 112. An end portion 134 of the locking tab 106 is then bent at a bend axis that is parallel to the elongate direction of the opening 112 and to the plane of the support portion 102, to engage (e.g., extend through) the locking aperture 130 of the gate 104. Thus, when the gate 104 is hinged from the open configuration to the closed configuration, the end portion 134 can be readily received through the aperture 130. Additionally, as desired, the end portion 134 can then be bent further (e.g., approximately 90° more) back towards the support portion 102, to lock the gate 104 in the closed configuration. In some configurations, the locking tab 106 can be configured to be readily bent, including as described above, without the use of tools.

Generally, an extension portion of a support device can help to separate a support portion of the support device from an associate support structure, so that the support portion can support cables or conduits at a particular distance away from the support structure. As noted above, the extension portion 110 is a front face of the support device 100, although other configurations are possible. Similarly, the extension portion 110 is substantially planar and includes a recessed (or protruding) feature 136 that provides additional stiffness to the extension portion 110 and the support device 100 overall. The feature 136 may be provided in various ways, for example, through embossing or extrusion and some support devices can include other (or no) features to provide increased strength, flexibility, or other characteristics.

In different embodiments, support devices may be formed in a variety of ways, using a variety of manufacturing techniques. For example, as also alluded to above, the support device 100 can be integrally formed from a single-piece blank using a series of stamping operations. In this regard, for example, as also noted above, FIG. 3 illustrates a blank that can be used to form the support device 100, after a series of stamping operations have cut the blank to allow the support portion 102, the support features 112, 122, and the locking tab 106 to be bent into a final geometry.

Figure 6A:
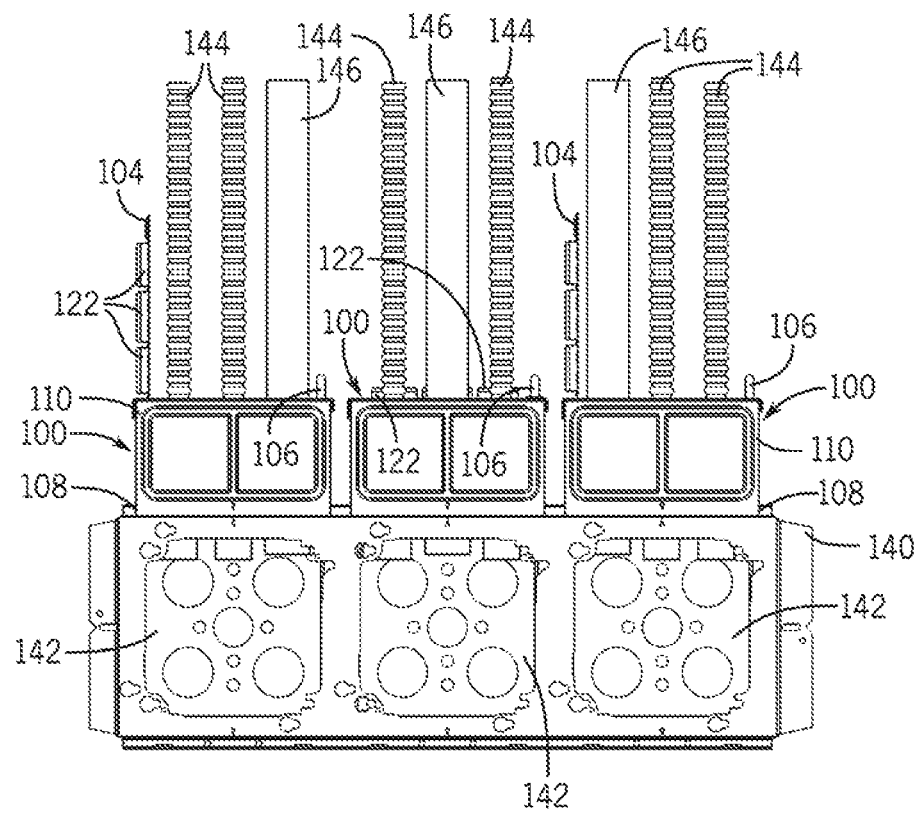
FIG. 6A is a front elevation view of a plurality of support devices as shown in FIG. 1 coupled to a plurality of electrical boxes and a support structure to provide a support system for the electrical boxes and associated electrical cables or conduits.

Different embodiments of the invention can be configured to engage a variety of different support structures, including support structures that are configured, in turn, to support electrical boxes, cables, and conduits relative to other building structures. Looking to FIG. 6A, for example, the engagement interface 108 is configured to removably engage a support structure 140 that is configured as a between-stud rigid support for multiple electrical boxes 142. In this regard, for example, the engagement interface 108 can be contoured in a variety of ways (not shown) so as to appropriately engage a corresponding interface on the support structure 140 and, as appropriate, secure to the support structure 140 using integral or separate fasteners. In some configurations, the engagement interface 108 can allow the support device 100 to be installed manually, without the use of tools or separate fasteners. As shown in FIG. 6A, the support structure 140 is configured to receive multiple instances of the support device 100 arranged adjacent to each other laterally along the support structure 140. In other embodiments, however, other configurations are possible.

As also shown in FIG. 6A, the gate 104 is configured to hinge upwardly, relative to the support structure 140 (e.g., and also relative to gravity), to move from the closed configuration to the open configuration and to hinge toward the support structure 140 to move from the open configuration to the closed configuration. In this regard, when the gate 104 is hinged to the open configuration (see also FIG. 4), the support paths of the support device 100 are correspondingly opened, so that, for example, the support device 100 can receive cable or conduit to be supported. Depending on the needs of the particular installation, a variety of configurations can be obtained, such as configurations in which the support device 100 receives one, two, or three cables or conduits in any variety of combinations. Once the cables or conduit are received in the partly open support paths, the gate 104 can then be hinged and secured closed (as also discussed above), in order to close the support paths around the relevant cables or conduit and thereby support the cables or conduit relative to a larger arrangement. Further, because the gate 104 is configured to readily open and close to receive and secure, respectively, the relevant cable or conduit, users may not be required to remove or otherwise manage knockouts on the support device 100, as may be required for some conventional designs.

Figure 5:
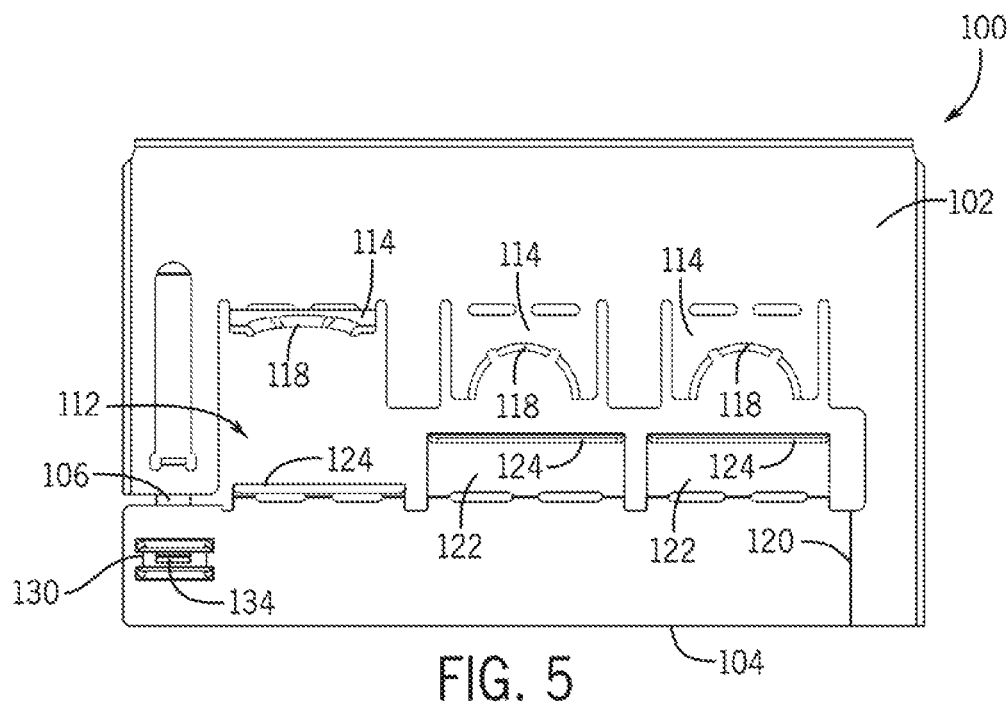
FIG. 5 is a top plan view of the support device of FIG. 1 with the gate in a fully closed and partly locked configuration.

Continuing to look at FIG. 6A, with additional reference to FIG. 5, cables 144 (shown here as MC cables) and the conduits 146 (shown here as ¾" EMT conduits) are shown installed on the support structure 140, extending from the various electrical boxes 142. In the illustrated implementation, the support portion 102 of the support device 100 is disposed on a first side of the conduits 146 and the cables 144 (i.e., the side facing out of the page), and the gate 104, when in the closed configuration, is disposed on a second side (hidden in FIG. 6A) of the conduits 146 and the cables 144 that is opposite the first side. Further, the engagement interface 108 is configured to engage the support structure 140 on the side of the support structure 140 adjacent to the first side of the conduits 146 or the cable 144, respectively. Thus, for example, and as also discussed below, the support device 100 can be readily moved in a single rearward direction, towards the front of the support structure 140 both to be engaged with the support structure 140 and to receive the cables 144 and the conduits 146 within the support opening 112 (see FIGS. 1-4).

Similarly, in some embodiments, the configuration of a gate and a support portion generally can allow a support device to be attached to a support structure after relevant cables or conduits have been secured to be supported by the support structure. For example, because the support opening 112, when the gate 104 is open, is substantially open along the side of the opening 112 defined by the gate 104, support opening 112 can readily receive cables and conduits without requiring the cables or conduits to be bent, angled, or otherwise manipulated. Thus, for example, with the gate 104 defining a wall along a back side of the support opening 112 when closed and opening the back side of the support opening 112 when open, the support device 100 can be moved rearwardly, with the gate open, to receive preinstalled cables and conduits into the support opening 112.

In this regard, the general hinging configuration of the gate 104 can also provide benefits during installation. As illustrated in FIG. 6A, the gate 104 can be rotated at least 90° relative to the support portion 102, so as to provide appropriate clearance to receive the cables 144 and the conduits 146 into the support opening 112. Further, as also detailed above, the gate 104 can be rotated to the illustrated open configuration of FIG. 6A without extending laterally outside of the spatial envelope defined by the extension portion 110 and the support portion 102 and without extending forwardly or rearwardly of the spatial envelope defined by the extension portion 110 and the support portion 102. Thus, the gate 104 can be opened and closed without requiring substantial clearance behind the support portion 102 (i.e., into the page in FIG. 6A) and without requiring substantial clearance to either lateral side of the support portion 102. Accordingly, the gate 104 can be readily opened and closed to receive and secure cables and conduits even with additional support devices installed in a closely adjacent configuration (e.g., as in FIG. 6A) and despite a work area not having substantial clearance behind the relevant cables and conduits (e.g., due to installation of drywall or other building structures.

For reasons discussed above, and to provide appropriate clearance for cables and conduits, it may therefore be useful for a gate to be configured to rotate by at 90° relative to a support portion of a support device. In some embodiments, however, gates can be configured to rotate by greater or fewer degrees between open and closed configurations.

It can be seen in FIG. 6A that the end portion 134 of each of the locking tabs 106 is bent approximately 90° relative to the rest of the locking tab 106 (see also FIG. 5) to extend through the aperture 130 in the gate 104 (see also FIG. 5). After the gate 104 is hinged from the open configuration to the closed configuration and the end portion 134 of the locking tab 106 is received through the aperture 130, the end portion 134 can then be bent approximately 90° more in the direction of the support portion 102 (see, e.g., FIG. 5) to extend towards the extension portion 110 (or otherwise), to lock the gate 104 in the closed configuration.

Figure 6B:
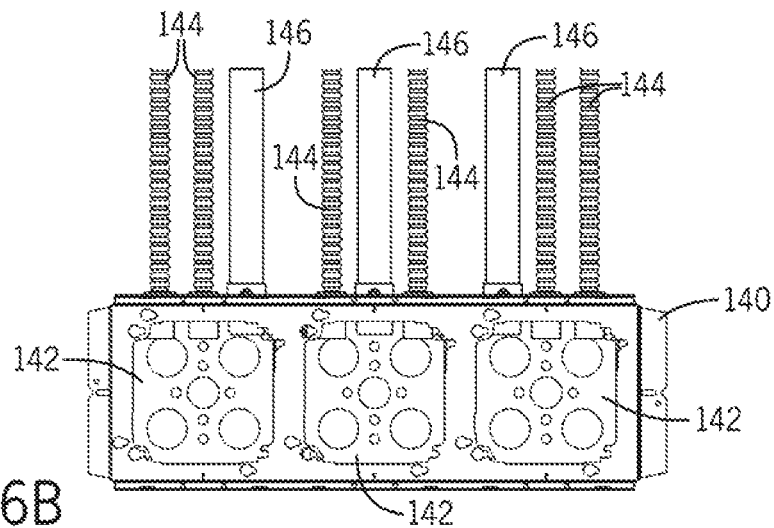
FIG. 6B-6D are front elevation views illustrating an installation method for the support devices of FIG. 6A.

As also noted above, in some embodiments, the configuration of a gate and a support portion generally can allow a support device to be attached to a support structure after relevant cables or conduits have been secured to be supported by the support structure. For example, as illustrated in FIG. 6B, the electrical boxes 142 can be secured to the support structure 140, which in turn can be secured to relevant building structures, such as between two studs (not shown). Appropriate cables, conduits and other fittings, such as the conduits 146 and the cables 144 and associated fittings can also be installed prior to installation of the support devices 100.

In some cases, appropriate fittings and the cables 144 and the conduits 146 can be secured to the support structure 140, via attachment of the fittings to the relevant electrical boxes (e.g., using screws accessed from the front side of the support structure 140), prior to the support structure 140 being secured to the relevant building structure (e.g., in a prefabrication process). In some cases, only the fittings and electrical boxes may be secured to the support structure 140 prior to the support structure 140 being secured to the structural supports, or no components may be secured to the support structure 140 until after the support structure 140 is secured to building structures. In some cases, all screws on the relevant fittings may be tightened before proceeding to the operations discussed below.

Figure 6C:
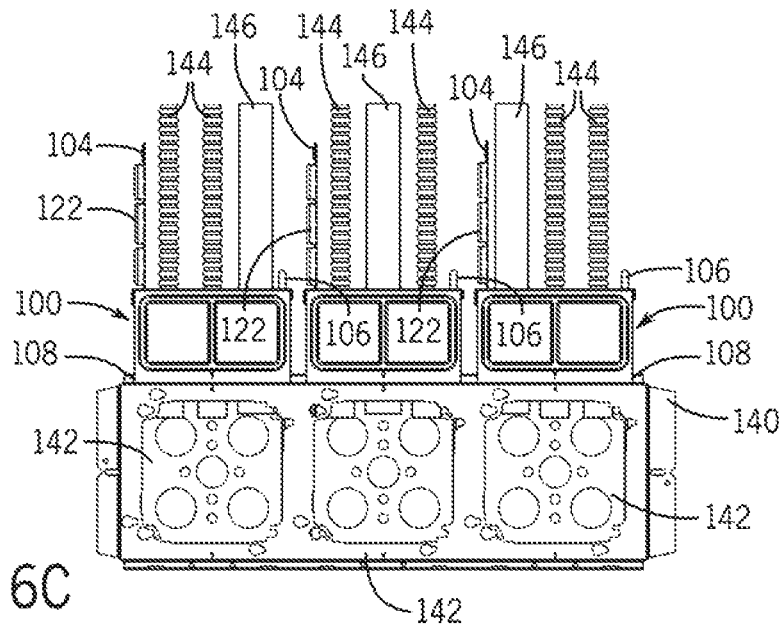

Continuing, as shown in FIG. 6C, with the cables 144 and the conduits 146 already installed, multiple instances of the support device 100 can then be secured to the support structure 140. In the embodiment illustrated in FIG. 6A, for example, three of the support devices 100 have been installed on the support structure 140, with the various cables 144 and the conduits 146 received in the relevant support paths. In particular, the gates 104 of the support devices 100 can first be rotated, as needed to the open configurations, so that the rear side of each of the support openings 112 is open (see also FIG. 4) and can thereby readily receive cables or conduits, even those that have already been installed and may therefore not be readily manipulable. The support devices 100 can then be moved rearwardly towards the support structure 140, generally in parallel with the support portion 102 and with the gate side of the support opening 112 leading (e.g., straight rearwardly or rearwardly with an upward or downward angled component), to engage the support engagement interfaces 108 with the support structure 140 as the relevant cables 144 and conduits 146 are received into the support openings 112.

Once the cables 144 and the conduits 146 are within the support openings 112, the gates 104 can be rotated closed, behind the cables 144 and the conduits 146 (i.e., into the page from the illustrated perspective) and on an opposite side of the cables 144 and the conduits 146 from the support structure 140, to secure and support the cables 144 and the conduits 146 within the support openings 112. Further, as needed, before or after the cables 144 and the conduits 146 are received within the support openings 112 or the gates 104 are closed, the relevant support features 114, 126 (see also FIG. 5) can be bent out of the plane of the support portion 102 to appropriately engage and support the relevant cables 144 or conduits 146. Thus, with the support portions 102 and the support openings 112 extending above the associated electrical boxes 142, the support devices 100 can provide appropriate first means of support for the electrical boxes 142.

In the configuration illustrated in FIG. 6C, the installation is partly complete, with the gates 104 on the two outer support devices 100 still open (e.g., as appropriate to receive the cables 144 and the conduits 146) and with the gate 104 on the inner support device 100 closed (e.g., as appropriate to secure and support the cables 144 and the conduits 146).

Figure 6D:
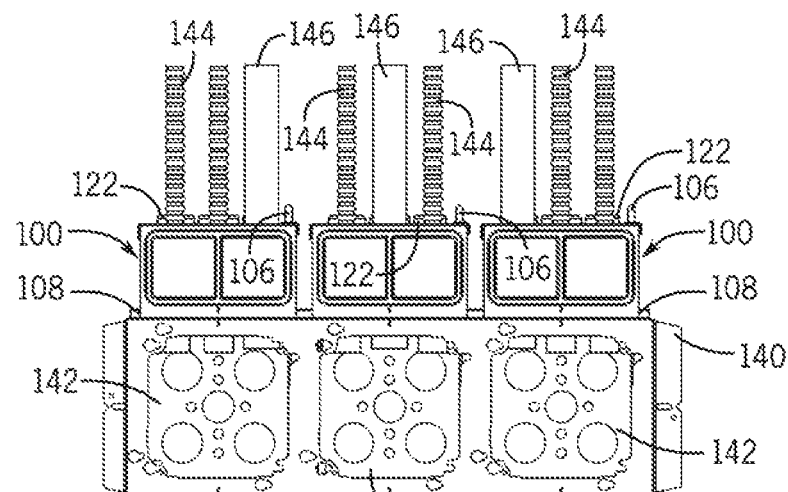

Still further with regard to the example installation method, FIG. 6D shows each of the gates 104 in a closed configuration, after the gates 104 have been hinged from the open configuration to the closed configuration, such that the cables 144 and the conduits 146 are substantially enclosed within the relevant support paths defined by the support devices 100. Further, the end portions 134 of the locking tabs 106 are received through the respective apertures 130 (see, e.g., FIG. 5), so that the locking tabs 106 are disposed to secure the gates 104 in the closed configuration. Thus arranged, for example, the end portions 134 can then be bent, as appropriate, approximately 90° more in the direction of the support portion 102 (see, e.g., FIG. 2), or otherwise, to lock the gate 104 in the closed configuration with the cables 144 and the conduits 146 in the respective support paths.

As similarly discussed above, FIGS. 6C and 6D further illustrate certain benefits of the general hinging configuration of the gates 104. For example, because the gates 104 are generally configured to effectively operate while rotating entirely within the lateral extent of the other structures of the support devices 100 (e.g., the support portions 102), the gates 104 can be hinged open and closed to secure or release the cables 144 and the conduits 146 without interference with adjacent devices, including closely adjacent other support devices. Similarly, because the gates 104 are generally configured to hinge entirely within the front-to-back extent of the support devices 100, which may in turn extend no further than an expected depth of an associated electrical box, the gates 104 can be hinged open and closed to secure or release the cables 144 and the conduits 146 without interference with other structures that may be installed ahead of or behind the associated electrical boxes.

As another example benefit of the illustrated embodiment, relative to conventional designs, in different operations, including as described above, it may be relatively easy to install the support device 100 (e.g., as described above) after cable or conduit has been installed on an electrical box. Thus, for example, cable or conduit can be installed as desired, including through tightening of screws from a front side of a support structure, and the support device 100 installed as appropriate thereafter. Similarly, the support device 100 can be relatively easily removed from a front (e.g., more accessible) side of a support structure, with the cables or conduits in place, in order to make further adjustments as needed. Further, because of this flexibility relative to installation, it may not be necessary to provide features in a support device to allow access to screws for cables or conduits after the support device has been installed, although such features can be provided as appropriate.

Figure 7:
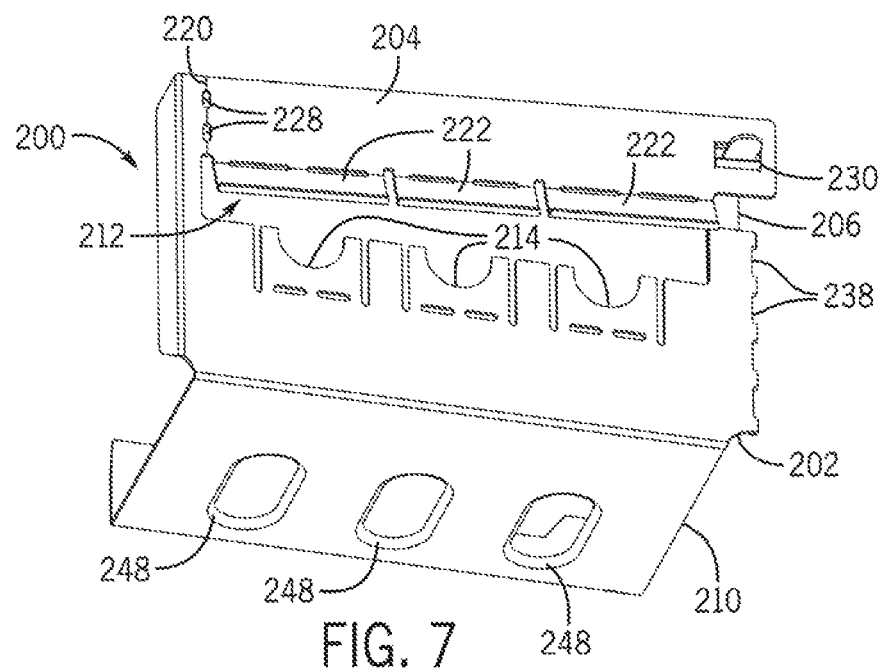
FIG. 7 is a top front isometric view of another embodiment of a support device according to the invention.
Figure 8:
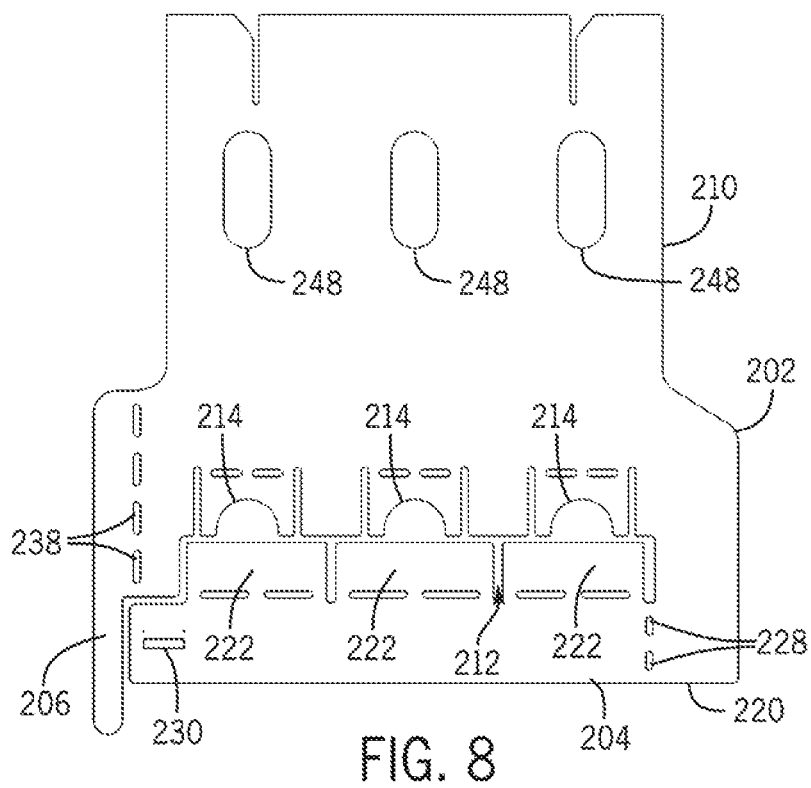
FIG. 8 is a top plan view of a partially stamped blank of the support device of FIG. 7.

FIGS. 7 and 8 illustrate a support device 200 according to another embodiment of the invention. In many aspects, the support device 200 is similar to the support device 100 described above and similar numbering, in the 200 series, is used for the support device 200. In some aspects, however, the support devices 100, 200 differ from each other. For example, one way in which the support devices 100, 200 differ is that the lateral distance between adjacent sets of support features 214 on a support portion 202 is greater than the lateral distance between adjacent sets of the support features 112 (see, e.g., FIG. 5). This can, for example, allow for the support device 200 to accommodate cables and conduits attached to a wider (or other) electrical box, in which the knockouts for receiving the relevant raceways may be spaced farther apart. For example, in some installations the support device 100 can be readily used in conjunction with a 4"×2⅛" electrical box, whereas the support device 200 can be readily used in conjunction with an electrical box with dimensions 4¹¹⁄₁₆"×2⅛".

The support device 200 also differs from the support device 100 in that a locking tab 206 extends along a lateral edge of a blank at the support portion 210 (see FIG. 8) rather than being formed from a slot (e.g., the slot 132 shown in FIG. 5). To arrange the support device 200 for use, the locking tab 206 can be folded over onto the support portion 210 along locking tab relief features 238, in order to align the locking tab 206 to engage a locking aperture 230 on a gate 204 and provide a double-thickness support portion for the locking tab 206. This arrangement can, for example, decrease the amount of space required for the locking tab 206 and accommodate limited spacing between wider electrical boxes that are mounted adjacently on shared (or other) supports.

Figure 3:
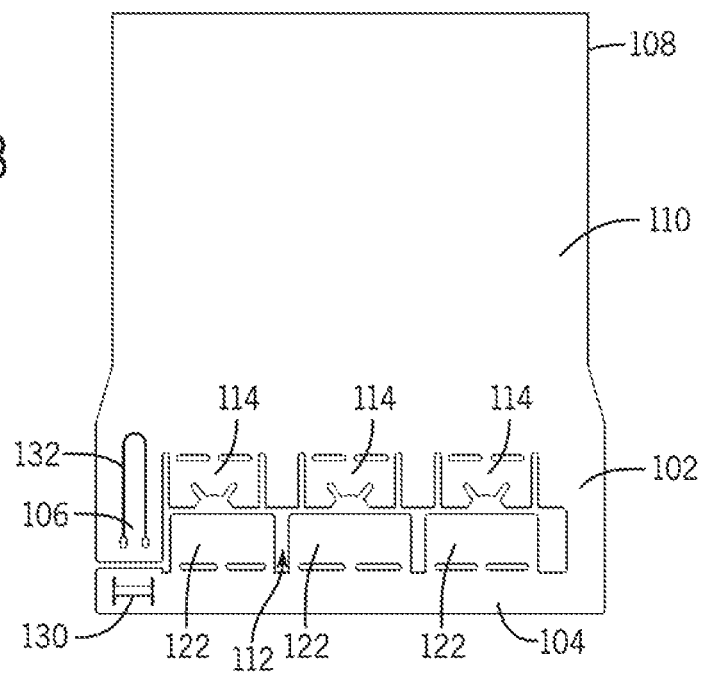
FIG. 3 is a top plan view of a partially stamped blank of the support device of FIG. 1.
Figure 4:
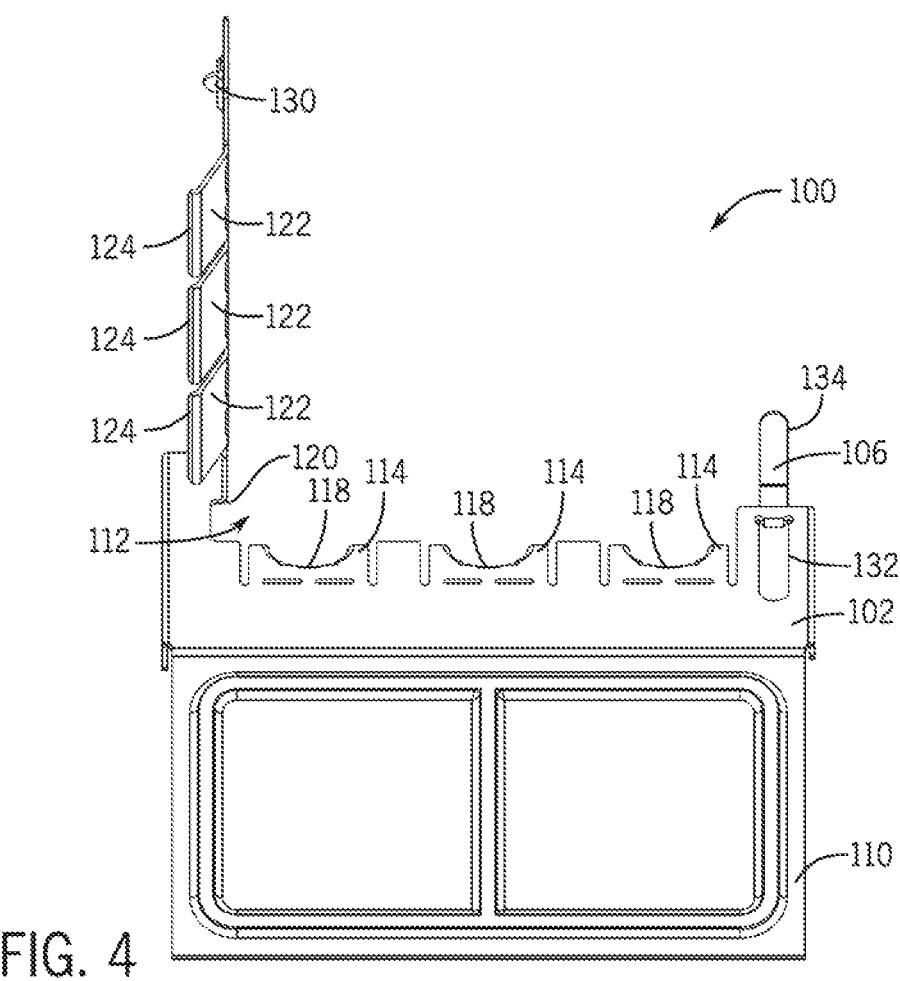
FIG. 4 is a front top isometric view of the support device of FIG. 1 with the gate in an open configuration.

For similar reasons, in the illustrated embodiment, a depth-wise spacing (i.e., generally vertically from the perspective of FIG. 8) between the locking aperture 230 (see FIG. 7) and gate support features 222 is somewhat larger than a depth-wise spacing between the aperture 130 and the gate support features 122 (see, e.g., FIG. 3). In some installations, this can also help to accommodate closer spacing between relatively wide electrical boxes. For example, the additional spacing in the support device 200 can allow the gate 204 to hinge fully open or closed, with appropriate clearance between the extended end of the gate 204 that includes the aperture 230 and another gate 204 of an adjacent support device 200 (not shown), even with the adjacent gate 204 in a fully open configuration.

Similarly to the gate 104, the gate 204 is also configured to hingedly open and close and to be secured in the closed configuration by the locking tab 206 and the aperture 230. In contrast to the gate 104, however, a hinge axis 220 for the support device 200 is defined by a set of cut-outs 228 rather than a score line.

As another example difference, an extension portion 210 of the support device 200 includes a plurality of oblong apertures 248, such as may provide some access to cables or conduits that are supported by the support device 200, or to the fasteners of associated fittings (not shown in FIGS. 7 and 8). Accordingly, for example, workers may be able to install, uninstall, or adjust cables or conduits for a particular installation after having installed, and without needing to remove, the support device 200. In some embodiments, including as illustrated, extruded or other features at the apertures 248 can provide increased strength and rigidity to the extension portion 210.

Figure 9:
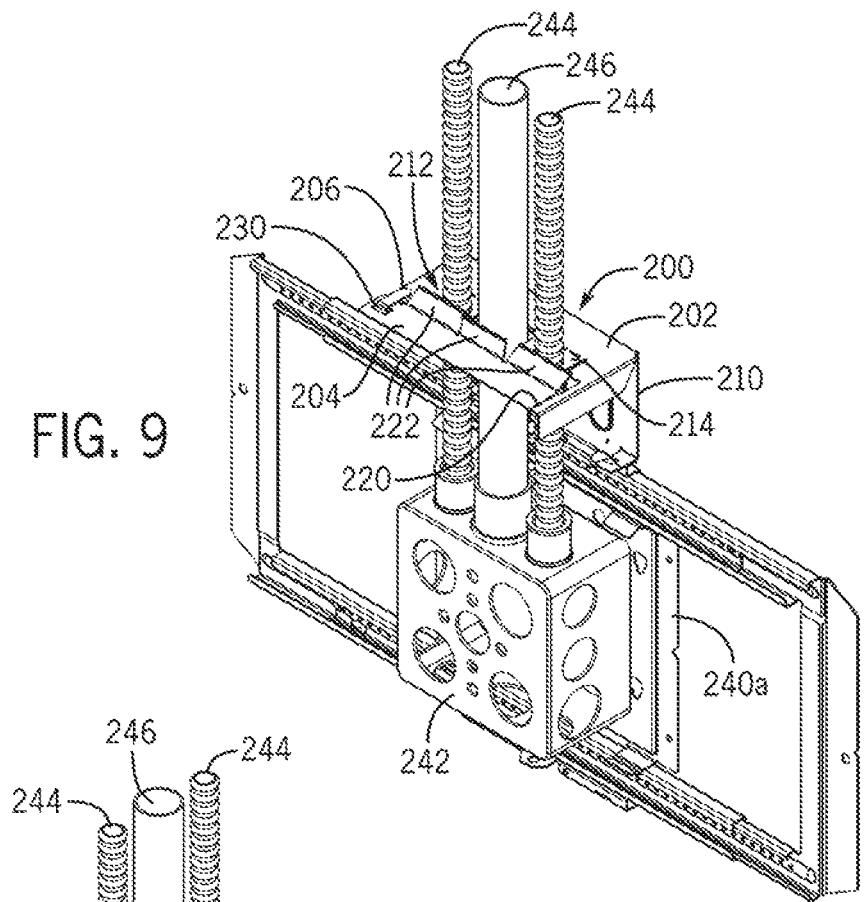
FIGS. 9 and 10 are top front and top back isometric views of the support device of FIG. 7 installed as part of a support system for an electrical box and associate electrical cables or conduits.
Figure 10:
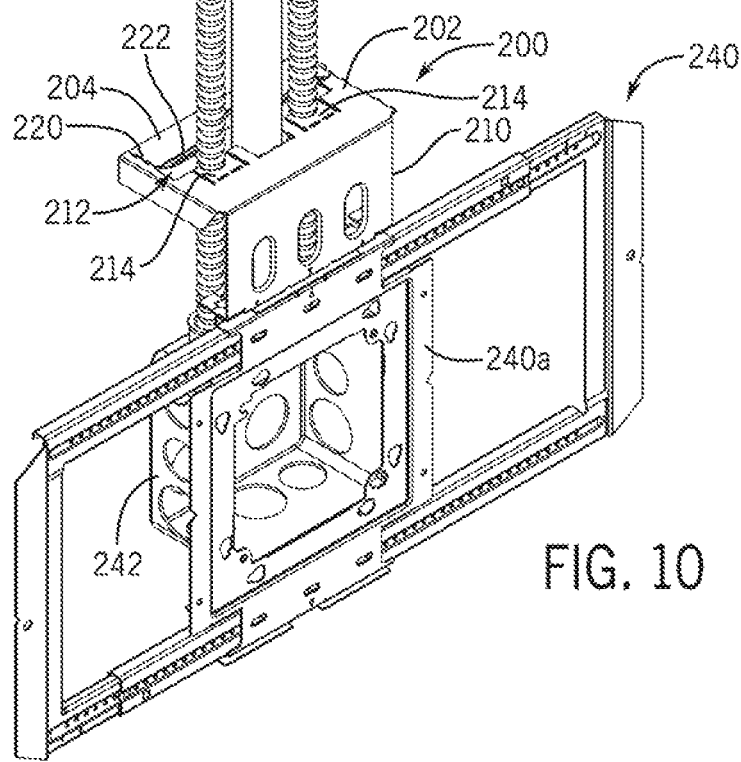

FIGS. 9 and 10 illustrate the support device 200 as mounted on a telescoping support assembly 240 with a support bracket 240a and an electrical box 242, in order to secure cables 244 and conduit 246 that extend upwardly from the electrical box 242 through a support opening 212 defined by the gate 204 and the support portion 202. As shown in FIG. 9 in particular, the locking tab 206 has been bent fully forward to secure the gate 204 and various support features 214, 222 (see also FIG. 7) have been bent to different degrees out of the plane of the gate 204, the support portion 202, and the support opening 212, in order to accommodate and support the different diameters of the cables 244 and the conduit 246. Generally, the support device 200 can be installed onto the support assembly 240 similarly to the support device 100 onto the support structure 140, including as described relative to FIGS. 6A-6D.

Figure 11:
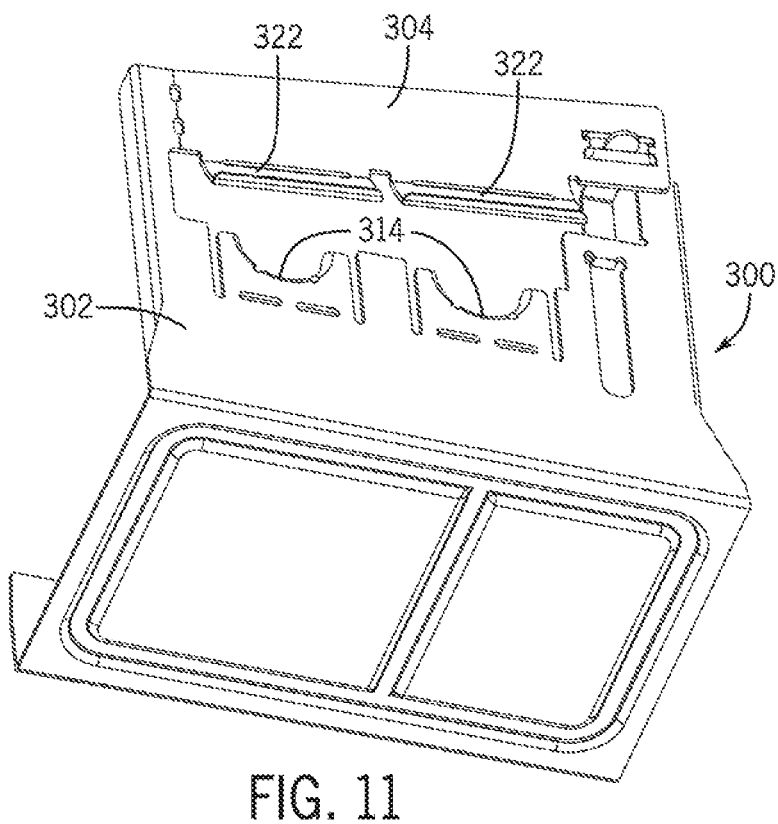
FIG. 11 is a top front isometric view of another embodiment of a support device according to the invention.

FIG. 11 shows a support device 300 according to another embodiment of the present invention. In many aspects, the support device 300 is similar to the support devices 100, 200 described above and similar numbering, in the 300 series, is used for the support device 300. In some aspects, however, the support devices 100, 200, 300 differ from each other. For example, in contrast to the support devices 100, 200, the support device 300 includes only two support paths defined by support features 314 on support portion 302 and support features 322 on a gate 304.

Figure 12:
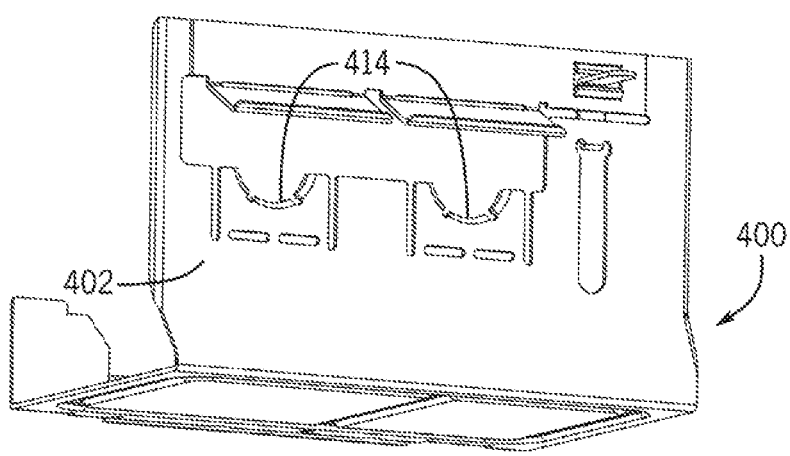
FIG. 12 is a top front isometric view of another embodiment of a support device according to the invention.

FIG. 12 shows a support device 400 according to still another embodiment to the present invention. In many aspects, the support device 400 is similar to the support devices 100, 200, 300 described above, particularly the support device 300, and similar numbering, in the 400 series is used for the support device 400. In some aspects, however, the support devices 100, 200, 300, 400 differ from each other. For example, the lateral distance between support features 414 on a support portion 402 is greater than the lateral distance between the support features 314 on the support portion 302 of the support device 300 (see FIG. 11). This can allow, for example, for the support device 400 to accommodate cables and conduits attached to a wider (or other) electrical box in which the knockouts for receiving such raceways are spaced farther apart. For example, in some installations, the support device 300 can be readily used in conjunction with a 4"×2⅛" electrical box, whereas the support device 400 can be readily used in conjunction with an electrical box with dimensions 4¹¹⁄₁₆"×2⅛".

Figure 13:
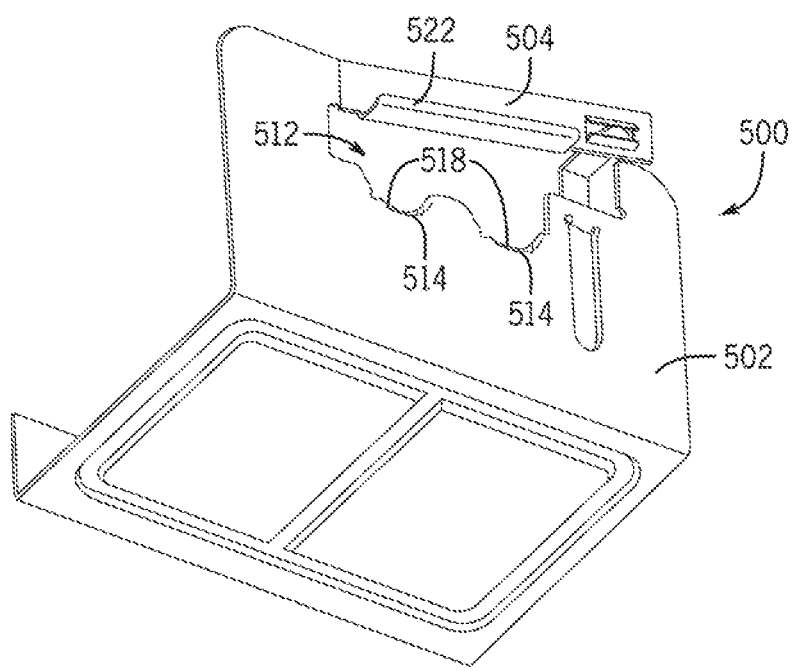
FIG. 13 is a top front isometric view of another embodiment of a support device according to the invention.

FIG. 13 illustrates another support device 500 according to an embodiment of the present invention. In many aspects, the support device 500 is similar to the support devices 100, 200, 300, 400 described above, particularly the support device 400, and similar numbering, in the 500 series is used for the support device 500. In some aspects, however, the support devices 100, 200, 300, 400, 500 differ from each other. For example, a support opening 512 of the support device 500 is configured to accommodate a duplex (Y-branch) fitting for MC cable. In such an installation, for example, two MC cables can enter one end of the duplex fitting (not shown), the other end of which enters an electrical box. The two MC cables can then be supported between a unitary support feature 522 of a gate 504 and distinct support features 514 of a support portion 502. As another example, the support features 514 of the support portion 510 are generally fixed (e.g., not manually bendable), albeit with a bent collar 518 similar to the collars 118 (see, e.g., FIG. 2), whereas the gate support feature 522 can be bent to contact the relevant cables or conduit. This can result in substantially simpler installation as compared to conventional designs, including due to the ability to secure two MC cables with adjustment of the single gate support feature 522.

Figure 14:
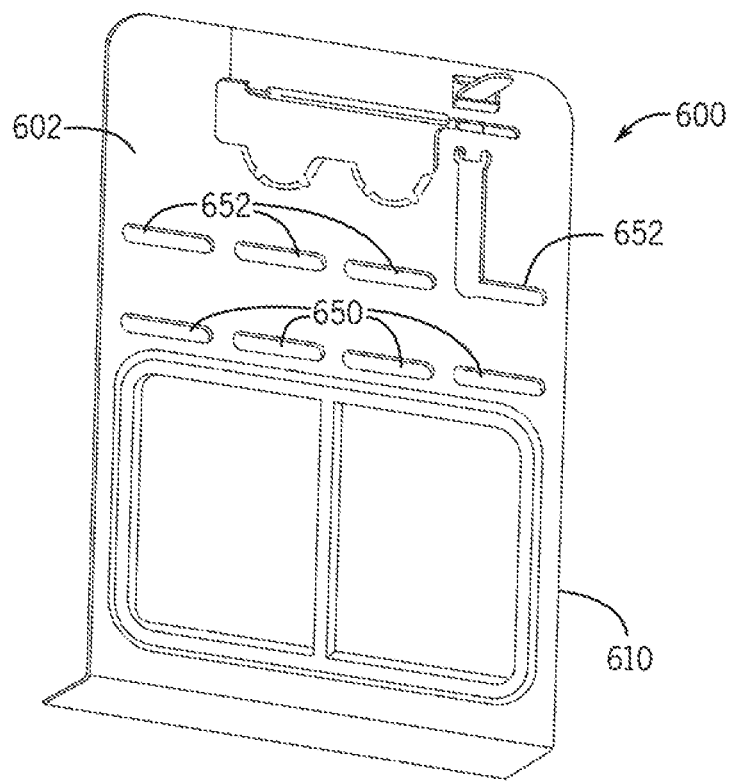
FIG. 14 is a top isometric view of another embodiment of a support device according to the invention, in a pre-installation configuration.

FIG. 14 illustrates a support device 600 according to still another embodiment of the present invention. In many aspects, the support device is similar to the support devices 100, 200, 300, 400, 500 described above, particularly the support device 500, and similar numbering, in the 600 series, is used for the support device 600. In some aspects, however, the support devices 100, 200, 300, 400, 500, 600 differ from each other. For example, a support portion 602 of the support device 600 is configured to be adjustable with respect to the depth of an electrical box, the cables or conduits of which the support device 600 is installed to support. For example, for a deeper electrical box (e.g., 2⅛" deep) a support portion 602 can be formed to extend rearwardly away from an extension portion 610 by bending the support device 600 at a first set of reliefs (e.g., slots) 650. In contrast, for a shallower electrical box (e.g., 1½" deep), the support portion 602 can be formed by bending the support device 600 relative to the extension portion 610 at a second set of reliefs (e.g., slots) 652. Corresponding to the adjustable depth of the support portion 602, it will also be recognized that bending the support device at different sets of the reliefs 650, 652 can also provide a different height for an extension portion 610.

In other embodiments, other configurations are possible. For example, certain features and combinations of features that are presented with respect to particular embodiments in discussion above, can be utilized in other embodiments and in other combinations, as appropriate. In this regard, for example, different configurations of support features, adjustable- or fixed-depth support portions, gate or locking structures, and so on, as presented with respect to a particular one of the support devices 100, 200, 300, 400, 500, 600 can be implemented in combination with features of any number of the other support devices 100, 200, 300, 400, 500, 600, or others.

Thus, embodiments of the inventions provide improved securement of conduit or cables to a support structure such as an electrical box. In some embodiments, support devices according to the invention can substantially reduce the time and labor that may be required during installation and use, such as by obviating the need to bend conduit and secure conduit or cable to a framing member. Further, some embodiments of the invention can be installed before or after the conduit or cable is connected to an electrical box or other structure. Additionally, some embodiments allow for various support arrangements with a variety of combinations and orders of conduit and cables for a variety of numbers of electrical boxes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

I claim:

1. A support device for electrical cable or conduit, for use with a support structure, the support device comprising:

an integrally formed support body that includes:
- a front portion that is configured to support the support body relative to the support structure; and
- a support portion that extends at an angle from the front portion and includes:
  - an opening to receive electrical cable or conduit, the opening defining a first plane extending laterally along the support portion;
  - a hinge axis disposed to the back of and at a first lateral end of the opening, the hinge axis being parallel to the first plane and extending from a back side of the opening toward a front side of the opening; and
  - a gate that defines, when in a closed configuration, a wall at the back side of the opening, the gate being configured to rotate about the hinge axis between the closed configuration in which the gate is parallel with the first plane to secure electrical cable or conduit in the opening and an open configuration in which the gate is not parallel with the first plane to allow electrical cable or conduit to be received within the opening.

2. The support device of claim 1, further comprising:
- a bendable locking tab that extends from front to back at a second lateral side of the opening and is configured to engage the gate opposite the hinge axis to secure the gate in the closed configuration.

3. The support device of claim 1, wherein the support portion is substantially planar along the first plane at the opening.

4. The support device of claim 1, wherein the gate hinges upwardly from the closed configuration to the open configuration to define a passage from behind the support body into the opening; and
- wherein the wall formed by the gate in the closed configuration closes the passage.

5. The support device of claim 3, wherein the support portion further includes a plurality of support features that extend into the opening and are configured to be bent out of the first plane to engage electrical cable or conduit aligned along a plurality of support paths that extend through the opening.

6. The support device of claim 5, wherein the plurality of support features includes:
- a first support feature on one of the gate or a part of the support portion opposite the gate; and
- a second support feature on an opposite side of the opening from the first support feature and aligned with the same support path as the first support feature;
- wherein the first support feature includes an arcuate support edge that is configured to engage metal clad cable; and
- wherein the second support feature includes a straight support edge.

7. The support device of claim 1, wherein the back side of the opening is open to receive electrical cable or conduit when the gate is in the open configuration, so that the support device is configured to be moved in a single rearward direction to be engaged with the support structure and to receive electrical cable or conduit that is already installed on the support structure.

8. The support device of claim 7, wherein, with the support device secured to extend above the support structure, the gate is configured to rotate upwardly away from the support structure to move from the closed configuration to the open configuration.

9. The support device of claim 8, wherein the gate is configured to rotate over a range of at least 90 degrees between the open and closed configurations.

10. A support device for electrical cable or conduit, for use with a support structure, the support device comprising:
- a support body that is configured to be engaged with the support structure, the support body including an opening that is elongate in a first direction and extends along a first plane; and
- a gate having at least one support feature, the gate being connected to the support body to define, in a closed configuration, a side of the opening that extends along the first direction, the at least one support feature configured to bend relative to the gate to secure electrical cable or conduit in the opening when the gate is in the closed configuration;
- the gate being configured to rotate away from the first plane, from the closed configuration, in which the gate extends in parallel with the first plane, to an open configuration, in which the gate extends at non-zero angle relative to the first plane, to open the side of the opening to receive electrical cable or conduit into the opening.

11. The support device of claim 10, wherein the gate is configured to rotate between the closed and open configurations about a hinge axis that extends at least one of in parallel with the first plane or perpendicular to the first direction.

12. The support device of claim 11, wherein the hinge axis extends along the first plane perpendicularly to the first direction.

13. The support device of claim 10, wherein the gate and the support body include a locking slot and a locking tab; and
- wherein the locking tab is configured to extend across the opening opposite the hinge axis to engage the locking slot and secure the gate in the closed configuration.

14. The support device of claim 13, wherein the locking tab is configured to extend in parallel with the first plane and perpendicularly to the first direction to engage the locking slot and secure the gate in the closed configuration.

15. The support device of claim 14, wherein the locking tab is configured to bend at the locking slot about a bend axis that is parallel to the first direction and to the first plane, to engage the locking slot and secure the gate in the closed configuration.

16. The support device of claim 10, wherein when the support device is secured at a top end of the support structure, the gate is configured to rotate upward away from the first plane to the closed configuration.

17. A method of installing a support device for electrical cable or conduit relative to a support structure, the method comprising:
- installing the electrical box on the support structure;
- installing electrical cable or conduit on an electrical box;
- providing a support device that includes a support body with a gate and an opening that extends along a first plane, the gate including at least one support feature configured to bend relative to the gate, the gate defining, in a closed configuration, a first side of the opening;
- rotating the gate away from the first plane to move the gate from the closed configuration to an open configuration and thereby open the first side of the opening;
- after installing the electrical cable or conduit on the electrical box and installing the electrical box on the support structure, and with the gate of the support structure in the open configuration, moving the support device towards the support structure in a first direction, at least a component of which extends in parallel with the first plane, to attach the support device to the support structure and receive the electrical cable or conduit in the opening via the first side of the opening; and rotating the gate to be in the closed configuration and bending the at least one support feature relative to the gate to secure the electrical cable or conduit within the opening.

18. The method of claim 17, wherein the support device is attached to the support structure with the opening above the electrical box so that the gate rotates upwardly away from the electrical box to move from the closed configuration to the open configuration.

19. The method of claim 18, wherein moving the support device in the first direction moves the support device towards a front side of the support structure.

* * * * *